United States Patent Office 2,829,140
Patented Apr. 1, 1958

2,829,140
AZO DYESTUFFS CONTAINING HEAVY METAL IN COMPLEX UNION

Guido Schetty, Hans Ackermann, and Fabio Beffa, Basel, Switzerland, assignors to J. R. Geigy A. G., Basel, Switzerland No Drawing. Application October 22, 1953
Serial No. 387,806
Claims priority, application Switzerland October 24, 1952

3 Claims. (Cl. 260—149)

The present invention concerns the production of azo dyestuffs containing heavy metal bound in a complex linkage but no acid water solubilizing groups. These dyestuffs are suitable for the dyeing from a neutral to weakly acid dyebath, of polypeptide fibres, in particular, of wool. The fibres are dyed in fast yellow brown to violet brown shades. In particular, the invention is concerned with the production of complex chromium and cobalt compounds of o.o′-dihydroxyazo dyestuffs of the type $(D_1-M_1-D_2)M_2$, wherein $D_1$ and $D_2$ represent two monoazo dyestuffs which may be the same or different, $M_1$ represents a chromium or cobalt atom and $M_2$ represents an alkali metal.

Whereas complex chromium and cobalt compounds of o.o′-dihydroxyazo dyestuffs of the above type having no acid water solubilizing groups such as sulphonic acid or carboxyl groups and no hydrophilic groups which have a favourable influence on the water solubility such as sulphonic acid amide or alkyl sulphone groups, are generally insufficient for dyeing purposes because of too slight water solubility or, because of insufficient fastness to rubbing, produce valueless wool dyeings, it has now been found that the dyestuff from diazotized 5-nitro-2-hydroxy-1-aminobenzene and 3.4-dimethyl-1-hydroxybenzene can be converted by known methods, not only alone but also in combination with other suitably substituted o.o′-dihydroxyazo dyestuffs containing no acid water solubilizing groups, into complex heavy metal compounds which have valuable dyeing properties and which produce fast-to-rubbing wool dyeings. The new dyestuffs are obtained if the monoazo dyestuff from diazotized 5-nitro-2-hydroxy-1-aminobenzene and 3.4-dimethyl-1-hydroxybenzene, or a mixture thereof with a monoazo dyestuff having no acid water solublizing groups which corresponds to the general Formula I.

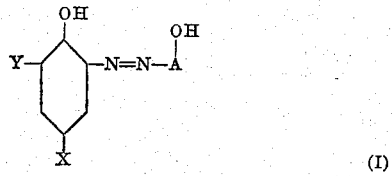

(I)

is reacted according to known methods with agents giving off chromium or cobalt in such amounts and under such conditions that 1 heavy metal atom is bound in complex union by two dyestuff molecules. In the above formula, A represents the radical of an azo component of the benzene, naphthalene, 1-phenyl-5-pyrazolone and acetoacetic acid phenyl amide series coupled in the neighbouring position to the phenolic or enolic hydroxyl group, X represents a nitro or an alkyl sulphone group and Y represents hydrogen or a non-ionogenic substituent usual in azo dyestuffs.

A particularly simple method of performing the process according to this invention consists in using the same diazo component for both dyestuffs. This is coupled with the mixture of 3.4-dimethyl-1-hydroxybenzene and the azo component corresponding to A and the dyestuff mixture is metallized by known methods. In a special way of performing the process, the azo component corresponding to A is 3.4-dimethyl-1-hydroxybenzene and a symmetrical metal-containing dyestuff is formed.

In the production of the monoazo dyestuffs of the Formula I, it is advantageous to use such 2-amino-1-hydroxybenzene compounds which contain a nitro group in the 4-position to the benzene ring. If desired, they can also be further substituted non-ionogenically in the 6-position, in this case preferably by the acetylamino or the nitro group. Also diazo components which have a low molecular alkyl sulphone group in the 4-position having, for example, 1 to 4 carbon atoms, produce suitable monoazo dyestuffs of the Formula I. Phenols coupling in the o-position to the hydroxyl group can be used as coupling components, e. g. 4-hydroxy-1-methyl benzene, 4-hydroxy-1.2-dimethyl benzene, 4-hydroxy-3-acetylamino-1-methyl benzene, naphthols coupling in the o-position to the hydroxyl group, e. g. 2-hydroxynaphthalene, 1-acetylamino-7-hydroxynaphthalene, 1-carbomethoxy-amino - 7 - hydroxynaphthalene, 6 - methoxy-2-hydroxy-naphthalene, 1-phenyl-5-pyrazolones which can be coupled in the 4-position of the pyrazolone ring, e. g. 1-phenyl-3-methyl-5-pyrazolone, 1-(2′- or 3′- or 4′-chlorophenyl)-3-methyl-5-pyrazolone. Also acetoacetic acid phenyl amides, e. g. acetoacetic acid anilide or -2′- -3′- or -4′-chloranilide.

Diazotization is performed in the usual way with sodium nitrite in a mineral acid solution or suspension in the cold and the coupling is done in an alkaline solution.

As agents giving off metal such compounds of heavy metals with co-ordination number 6 can be used, preferably chromium and cobalt compounds because of the stability and purity of the shades of their dyestuff complexes. For example chromic fluoride, chromic acetate, chromic formiate, cobalt chloride, cobalt nitrate, cobalt sulphate and, if desired, also complex compounds of these metals, e. g. the alkali salts of chromosalicylic acid, can be used. The reaction can be performed in aqueous solution or suspension or in organic solution, e. g. in lower alcohols, formamide or in N-dimethyl formamide. It is of advantage to ensure that the reaction is weakly acid, neutral or weakly alkaline by working in the presence of alkali salts of weak acids, e. g. in the presence of sodium acetate; a mineral acid reaction has an unfavourable effect on the metallization. The agent giving off metal should be used preferably in such amounts that there is at least one atom of heavy metal to two dyestuff molecules. An excess is not disadvantageous if the reaction is weakly acid to alkaline. It is advantageous to convert complex heavy metal compounds produced in an acid medium into the more water soluble alkali salts by an after-treatment with alkalies.

The two dyestuffs $D_1$ and $D_2$ should be used preferably in equimolecular proportions, but small differences in this ratio do not disturb much. According to the composition, the new homogeneous or mixed heavy metal complexes are yellow-brown to dark brown powders which dissolve with a corresponding colour in hot water. They dye polypeptide fibres such as wool, silk, superpolyamide and superpolyurethane or casein fibres from a neutral to weakly acid bath in very fast yellow-brown, red-brown brown, violet-brown or grey-brown shades. If necessary, the dyestuffs containing heavy metal according to the present invention can be mixed with salts having an alkaline reaction such as sodium carbonate, trisodium phosphate or with capillary active wetting and dispersing agents to improve their water solubility.

The following examples illustrate the invention without limiting it in any way. Where not otherwise stated, the parts are given as parts by weight and the temperatures are in degrees centigrade. The relationship of parts by weight to parts by volume is as that of kilogrammes to litres.

EXAMPLE 1

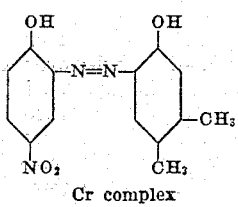
Cr complex 77 parts of 4-nitro-2-amino-1-phenol are diazotized in the usual way and the diazonium compound is neutralized with sodium bicarbonate. The suspension so obtained is poured into a solution of 64 parts of 3.4-dimethyl-1-phenol, 750 parts of water, 55 parts by volume of 10 N-caustic soda lye and 70 parts of anhydrous soda. The mixture is stirred at 15–20° until the coupling is complete, it is then heated to 70°, the dyestuff is precipitated by the addition of sodium chloride, filtered off hot, and washed first with diluted sodium chloride solution and then with water. The still damp dyestuff is then stirred into 1500 parts of water and 10 parts of sulphonated castor oil overnight, 550 parts by volume of a solution of ethanolamine chromosalicylate (corresponding to 14.3 parts of Cr) are added and the whole is boiled under reflux for 8 hours. The complex chromium compound is filtered off hot and dried. On mixing with an amount of a synthetic washing agent of the fatty alcohol sulphonate type corresponding to 70% of its weight, a dark brown powder is obtained which dissolves well in hot water. It dyes wool from a neutral or weakly acid bath in full reddish-brown shades which have good fastness to light and very good fastness to milling and rubbing.

Ethanolamine chromosalicylate is produced as follows: 274 parts of salicylic acid are dissolved in 200 parts of hot water with 132 parts of monoethanolamine. The solution is heated to 80° and a hot 7% by volume chromic fluoride solution (corresponding to 52 parts of Cr) is added. The whole is then heated to 90–95° and a solution of 118 parts of monoethanolamine and 80 parts of water is added dropwise within 20 minutes until there is an alkaline reaction to brilliant yellow. After a slight precipitate has been filtered off, the filtrate is made up to 2000 parts by volume with water.

EXAMPLE 2

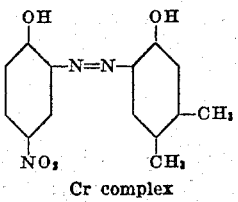
Cr complex

The monoazo dyestuff produced according to Example 1 from 77 parts of 4-nitro-2-amino-1-phenol is stirred into 1500 parts of water and 10 parts of sulphonated castor oil and boiled for 8 hours with 620 parts of a solution of ammonium chromosalicylate (corresponding to 14.3 parts of Cr). The dyestuff which precipitates in crystalline form is filtered off at 80°, dried and mixed with 70% of its weight of soap powder. The product so obtained has similar properties to the chromium containing dyestuff described in Example 1.

EXAMPLE 3

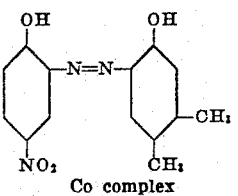
Co complex 30.9 parts of the sodium salt of the dyestuff from diazotized 4-nitro-2-amino-1-hydroxybenzene and 3.4-dimethyl-1-hydroxybenzene are heated in 600 parts of water with 60 parts of cobalt acetate, corresponding to 3.54 parts of cobalt, for 1 hour at 80–85°. The reaction is then made phenolphthalein-alkaline by the addition of soda and the whole is stirred for 1 hour at the same temperature. The complex cobalt compound is completely precipitated by the addition of sodium chloride, after which it is filtered off and dried. The dyestuff is a brown powder which dyes wool from a neutral to weakly acid bath in very fast red-brown shades.

EXAMPLE 4

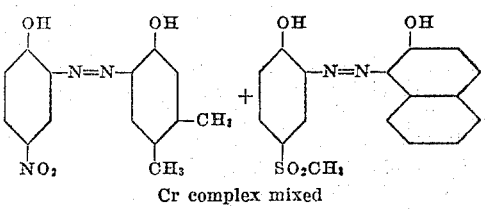
Cr complex mixed 15.5 parts of the sodium salt of the dyestuff from diazotized 4-nitro-2-amino-1-hydroxybenzene and 3.4-dimethyl-1-hydroxybenzene and 18.2 parts of the sodium salt of the dyestuff from diazotized 2-amino-1-hydroxybenzene-4-methyl sulphone and 2-hydroxynaphthalene in 600 parts of hot water are added to 120 parts by volume of a solution of ammonium chromosalicylate, corresponding to 4.2 parts of chromic oxide, and after the addition of 10 parts of sulphonated castor oil, the whole is boiled under reflux for 2 hours. The mixed complex which completely precipitates is filtered off and dried. It dyes wool from a neutral to a weakly acid bath in very fast violet-brown shades.

EXAMPLE 5

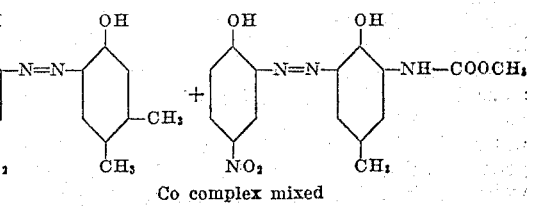
Co complex mixed 15.5 parts of the sodium salt of the dyestuff from diazotized 4-nitro-2-amino-1-hydroxybenzene and 3.4-dimethyl-1-hydroxybenzene and 18.4 parts of the sodium salt of the dyestuff from diazotized 4-nitro-2-amino-1-hydroxybenzene and 4-methyl-2-carbomethoxyamino-1-hydroxybenzene in 600 parts of water are heated for 1 hour at 80° with 60 parts of cobalt acetate, corresponding to 3.54 parts of cobalt. Anhydrous soda is then added until there is a phenolphthalein-alkaline reaction and the whole is then stirred for a further 5 hours at 80–85°. The mixed complex is filtered off and dried. It dyes wool from a neutral to weakly acid bath in very fast red-brown shades.

EXAMPLE 6

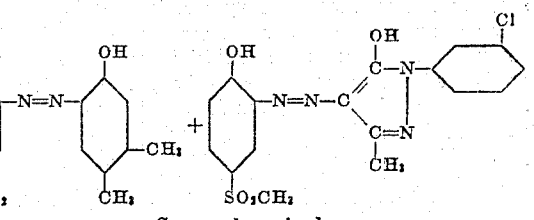
Co complex mixed 15.5 parts of the sodium salt of the dyestuff from diazotized 4-nitro-2-amino-1-hydroxybenzene and 3.4-dimethyl-1-hydroxybenzene and 21.4 parts of the sodium salt of the dyestuff from diazotized 2-amino-1-hydroxybenzene-4-methyl sulphone and 1-(3'-chlorophenyl)-3-methyl-5-pyrazolone are stirred at 80° in 600 parts of water with 60 parts of cobalt acetate, corresponding to 3.54 parts of cobalt, until no starting dyestuff can be detected. The mixture is then made alkaline by the addition of soda and stirred for a further 5 hours at the same temperature. The complex cobalt compound is completely separated by the addition of sodium chloride. After drying, it is a brown powder which dyes wool from a neutral to weakly acid bath in very fast orange-brown shades.

The following table contains further complex heavy metal compounds which can be obtained according to the process described in the examples from the dyestuff 4-nitro-2-amino-1-hydroxybenzene→
                           3.4-dimethyl-1-hydroxybenzene mixed with the dyestuff II.

Table

| No. | Dyestuff II | Metal | Color of the wool dyeing |
|---|---|---|---|
| 1 | 2-amino-1-hydroxybenzene-4-methyl sulphone ——→ 1-(3'-chlorophenyl)-3-methyl-5-pyrazolone. | Cr | Red-brown. |
| 2 | 4-nitro-2-amino-1-hydroxybenzene ——→ 1-phenyl-3-methyl-5-pyrazolone. | Cr | Do. |
| 3 | 4.6-dinitro-2-amino-1-hydroxybenzene ——→ 1-phenyl-3-methyl-5-pyrazolone. | Cr | Do. |
| 4 | ----do---- | Co | Orange-brown. |
| 5 | 4-nitro-2-amino-1-hydroxybenzene ——→ 4-methyl-2-carbomethoxy-amino-1-hydroxybenzene. | Cr | Brown. |
| 6 | 4-nitro-2-amino-1-hydroxybenzene ——→ 4-methyl-2-carbethoxyamino-1-hydroxybenzene. | Cr | Do. |
| 7 | ----do---- | Co | Red-brown. |
| 8 | 4-nitro-2-amino-1-hydroxybenzene ——→ 4-methyl-2-carbomethoxy-ethoxyamino-1-hydroxybenzene. | Cr | Brown. |
| 9 | 4-nitro-6-acetylamino-2-amino-1-hydroxybenzene ——→ 3.4-dimethyl-1-hydroxybenzene. | Cr | Do. |
| 10 | ----do---- | Co | Orange-brown. |
| 11 | 2-amino-1-hydroxybenzene-4-methyl-sulphone ——→ acetoacetic acid phenyl amide. | Co | Yellow-brown. |
| 12 | 2-amino-1-hydroxybenzene-4-methyl sulphone ——→ acetoacetic acid-2'-chlorophenyl amide. | Co | Do. |
| 13 | 4-nitro-2-amino-1-hydroxybenzene ——→ 2-hydroxynaphthalene. | Cr | Violet-brown. |
| 14 | 4-nitro-2-amino-1-hydroxybenzene ——→ 1-carbomethoxyamino-7-hydroxynaphthalene. | Cr | Grey-brown. |
| 15 | 4-nitro-6-methyl-2-amino-1-hydroxybenzene ——→ 3.4-dimethyl-1-hydroxybenzene. | Cr | Brown. |
| 16 | ----do---- | Co | Red-brown. |
| 17 | 4-nitro-6-chloro-2-amino-1-hydroxybenzene ——→ 3.4-dimethyl-1-hydroxybenzene. | Cr | Brown. |
| 18 | ----do---- | Co | Red-brown. |
| 19 | 2-amino-1-hydroxybenzene-4-ethyl sulphone ——→ 1-(3'-chlorophenyl)-3-methyl-5-pyrazolone. | Cr | Do. |
| 20 | ----do---- | Co | Yellow-brown. |

EXAMPLE 7

2 parts of the dyestuff according to Example 1 are dissolved in 4000 parts of water. 100 parts of wool are entered at 50°, the bath is brought to the boil within 45 minutes and kept at this temperature while moving the wool well for 1½ hours, after which the goods are rinsed and dried. The wool which has been dyed in reddish brown full shades is very fast to milling, washing and light. In addition, the dyeings are very level.

EXAMPLE 8

1 part of the dyestuff according to Example 2 is dissolved in 4000 parts of water, 0.6 part of acetic acid and 10 parts of Glauber's salt are added and 100 parts of nylon are entered at 40°. The bath is brought to the boil with ¾ hour, kept boiling for 1 hour while moving the nylon well, after which the nylon is rinsed and dried. The nylon which has been dyed in reddish-brown shades is very fast to washing and light.

What we claim is:

1. A dyestuff consisting essentially of a complex heavy metal compound of the formula $$[D_1—M_1—D_2]M_2$$

wherein $M_1$ is selected from the group consisting of chromium and cobalt, $M_2$ is an alkali metal cation, and $D_1$ and $D_2$ are co-ordinated dyestuffs of the formula

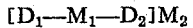
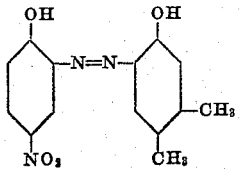

2. A dyestuff consisting essentially of a complex chromium compound of the formula:

$$[D_1—Cr—D_2]M$$

wherein M is an alkali metal cation, and $D_1$ and $D_2$ are co-ordinated monoazo dyestuffs of the formula:

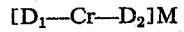
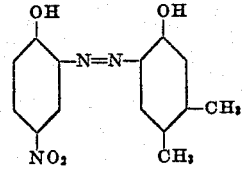

3. A dyestuff consisting essentially of a complex cobalt compound of the formula:

$$[D_1—Co—D_2]M$$

wherein M is an alkali metal cation, and $D_1$ and $D_2$ are co-ordinated monoazo dyestuffs of the formula:

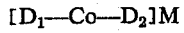
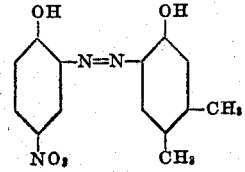

References Cited in the file of this patent

UNITED STATES PATENTS

| 2,551,056 | Schetty | May 1, 1951 |
| 2,673,199 | Widmer et al. | Mar. 23, 1954 |